(12) United States Patent
Kooi

(10) Patent No.: US 11,148,686 B2
(45) Date of Patent: Oct. 19, 2021

(54) RAILWAY CAR FITTED WITH AN INDUCTION GENERATOR

(71) Applicant: Carrier Corporation, Jupiter, FL (US)

(72) Inventor: Eeuwe Durk Kooi, Noordwijk (NL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 376 days.

(21) Appl. No.: 16/095,278

(22) PCT Filed: Apr. 10, 2017

(86) PCT No.: PCT/US2017/026804
§ 371 (c)(1),
(2) Date: Oct. 19, 2018

(87) PCT Pub. No.: WO2017/184366
PCT Pub. Date: Oct. 26, 2017

(65) Prior Publication Data
US 2019/0135309 A1 May 9, 2019

(30) Foreign Application Priority Data
Apr. 21, 2016 (NL) ...................................... 2016655

(51) Int. Cl.
*B61C 3/02* (2006.01)
*B61D 43/00* (2006.01)
(Continued)

(52) U.S. Cl.
CPC ............... *B61D 43/00* (2013.01); *B61C 3/00* (2013.01); *B61C 3/02* (2013.01); *B61D 27/0081* (2013.01); *Y02T 30/00* (2013.01)

(58) Field of Classification Search
CPC .. B61C 3/00; B61C 3/02; B61D 43/00; H02K 7/1846; H02K 5/04; F03G 7/08
See application file for complete search history.

(56) References Cited

U.S. PATENT DOCUMENTS 5,488,287 A 1/1996 Kemner et al.
6,220,175 B1 * 4/2001 Folk ..................... H02K 7/1846
105/136
(Continued)

FOREIGN PATENT DOCUMENTS

CH 564445 A5 7/1975
CN 1373548 A 10/2002
(Continued)

OTHER PUBLICATIONS

International Search Report and Written Opinion for application PCT/US2017/026804, dated Jul. 20, 2017, 10 pages.
(Continued)

*Primary Examiner* — Mark T Le
(74) *Attorney, Agent, or Firm* — Cantor Colburn LLP

(57) ABSTRACT

A railway car fitted with an induction generator comprising magnets and electrical conductors for generating electricity, comprising a chassis comprising at least one axle with two wheels, wherein the axle is mounted in two bearings located near the two sides of the railway car, wherein the wheels are located on the outer side of the bearings, and wherein the generator comprises a rotor and a substantially cylindrical stator, which stator extends concentrically around the rotor, wherein the rotor is fixedly mounted around and on the axle, wherein the stator is mounted to the inner side of one of the bearings, in axial abutment therewith.

13 Claims, 2 Drawing Sheets

(51) Int. Cl.
*B61C 3/00* (2006.01)
*B61D 27/00* (2006.01)

(56) References Cited

U.S. PATENT DOCUMENTS

| | | | |
|---|---|---|---|
| 8,847,448 B2* | 9/2014 | Tsui | B61C 9/46 310/75 C |
| 2009/0294188 A1* | 12/2009 | Cole | B60K 1/00 180/65.1 |
| 2012/0091710 A1* | 4/2012 | Evans | F01D 1/20 290/43 |
| 2014/0265650 A1* | 9/2014 | Jeon | H02K 33/16 310/25 |
| 2016/0068072 A1* | 3/2016 | Fan | B60L 53/00 180/55 |

FOREIGN PATENT DOCUMENTS

| | | |
|---|---|---|
| CN | 101003276 A | 7/2007 |
| CN | 102164800 A | 8/2011 |
| CN | 203707993 U | 7/2014 |
| CN | 203974831 U | 12/2014 |
| DE | 2551009 A1 | 5/1977 |
| EP | 0008173 A1 | 2/1980 |
| EP | 0701315 A1 | 3/1996 |
| EP | 1033296 A2 | 9/2000 |
| GB | 673869 A | 6/1952 |
| GB | 2321788 A | 8/1998 |
| JP | H0467748 A | 3/1992 |
| JP | H0923624 A | 1/1997 |
| JP | H09117099 A | 5/1997 |
| WO | 9733358 A1 | 9/1997 |
| WO | 9819381 A1 | 5/1998 |
| WO | 2010028417 A1 | 3/2010 |
| WO | 2013100113 A1 | 7/2013 |

OTHER PUBLICATIONS

Chinese Office Action for application CN 201780024740.0, dated Jan. 2, 2020, 9 pages.

* cited by examiner

RAILWAY CAR FITTED WITH AN INDUCTION GENERATOR

BACKGROUND

The present invention relates to a railway car fitted with an induction generator comprising magnets and electrical conductors for generating electricity, comprising a chassis comprising at least one axle with two wheels, wherein the axle is mounted in two bearings located near the two sides of the railway car, wherein the wheels are located on the outer side of the bearings, and wherein the generator comprises a rotor and a substantially cylindrical stator, which stator extends concentrically around the rotor, wherein the rotor is fixedly mounted around and on the axle. Such railway cars are known, for example from US 2008/0018110, JP H04-67748, JP H09-117099 and JP H09-23624. The stator of said known railway cars is restrained from rotation about the axle by an arm that is attached to the fixed chassis of the railway car.

There are also known railway cars wherein the wheels are located on the inner side of the bearings, and wherein the generator is mounted on the outer side of the bearings, such as, for example, in WO 97/33358, WO 98/19381, GB 673,869, EP 1 033 296, GB 2 321 788, U.S. Pat. No. 5,488,287 and EP 0 701 315. A drawback of such railway cars is that the wheels of this type of rail units need to be reconditioned quite frequently (every 200,000 km) because the tread of the wheel is also used as a brake body. More recent train units are fitted with disc brakes, enabling those units to run millions of kilometres without needing to be reconditioned. The drawback as regards the power supply is that bearings at the inner side are now used, rendering it impossible to mount a generator on the outer side.

SUMMARY

The object of the invention is to provide a compact, robust, reliable and/or easy-to-install generator system for railway cars provided with bearings at the inner side.

In order to achieve that object, the stator is mounted to the inner side of one of the bearings, in axial abutment therewith. The stator is preferably mounted to the inner wall of a substantially cylindrical housing, which housing is mounted to the inner side of one of the bearings, wherein the housing preferably has a radially outwardly extending circumferential flange at the outer end, which flange is mounted to the inner side of the bearing, and wherein the housing preferably has a radially inwardly, toward the axle, extending circumferential flange at the inner end, which flange to a large extent seals the interior of the housing.

The invention also relates to an induction generator comprising magnets and electrical conductors, intended for generating electricity in a railway car comprising a chassis comprising at least one axle with two wheels, wherein the axle of the railway car is mounted in two bearings located near the two sides of the railway car, and wherein the wheels are located on the outer side of the bearings, wherein the generator comprises a rotor and a substantially cylindrical stator, which stator extends concentrically around the rotor in mounted condition, and wherein the rotor is configured to be fixedly mounted around and on the axle of the railway car, wherein the stator is provided with means for being mounted to the inner side of one of the bearings, in axial abutment therewith. The stator is preferably mounted to the inner wall of a substantially cylindrical housing, which housing is configured to be mounted to the inner side of one of the bearings. The housing preferably has a radially outwardly extending circumferential flange at the outer end, which flange is configured to be mounted to the inner side of the bearing. The housing preferably has a radially inwardly, toward the axle, extending circumferential flange at the inner end, which flange to a large extent seals the interior of the housing in mounted condition.

The generator may for example be a synchronous generator, an asynchronous generator or a switched-reluctance generator, for example a generator wherein the rotor comprises the magnets and the stator comprises the electrical conductors, which magnets are for example permanent magnets. The magnets are preferably mounted in recesses in the circumference of the axle, which recesses have preferably been milled in the circumference of the axle.

The conductors are preferably connected to an inverter that is configured to control the current, the frequency and/or the voltage of the electricity being generated, because the speed of rotation of the axle usually varies from 0 to about 1300/min. The conductors are furthermore preferably connected, whether or not via an inverter, to a battery in which the generated electricity is stored.

The railway car may be a refrigerator car, for example, wherein the electricity is used for refrigerating the load compartment of the car.

DESCRIPTION OF DRAWINGS

The invention will now be explained in more detail with reference to an embodiment as shown in the figures, in which.

DETAILED DESCRIPTION

Figure 1:
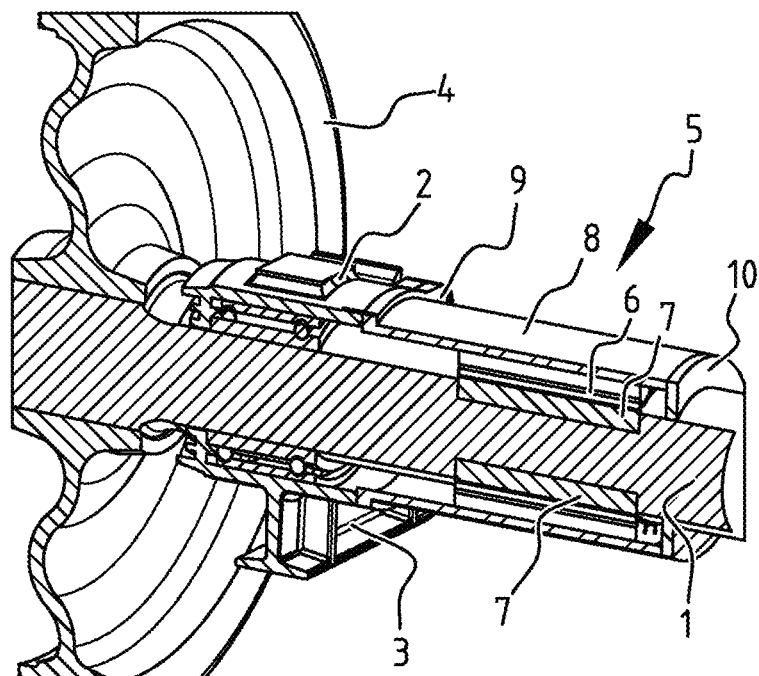
FIG. 1 is a perspective sectional view of an end of a railway car axle with a bearing, a wheel and a generator.
Figure 2:
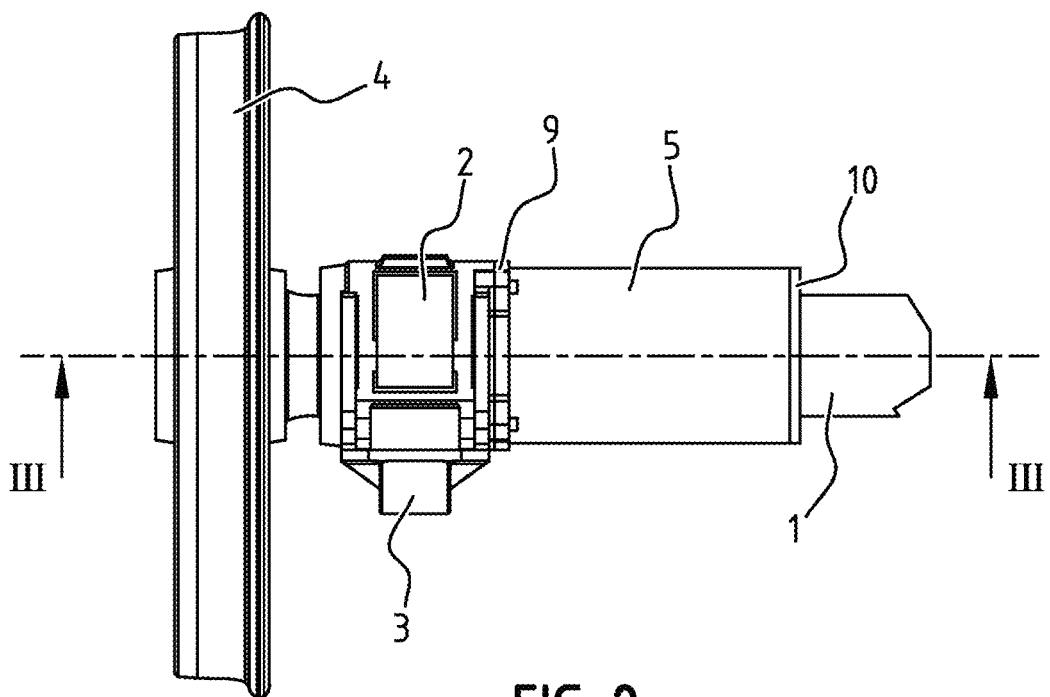
FIG. 2 is a front view of the end of the railway car axle with the bearing, the wheel and the generator of FIG. 1.
Figure 3:
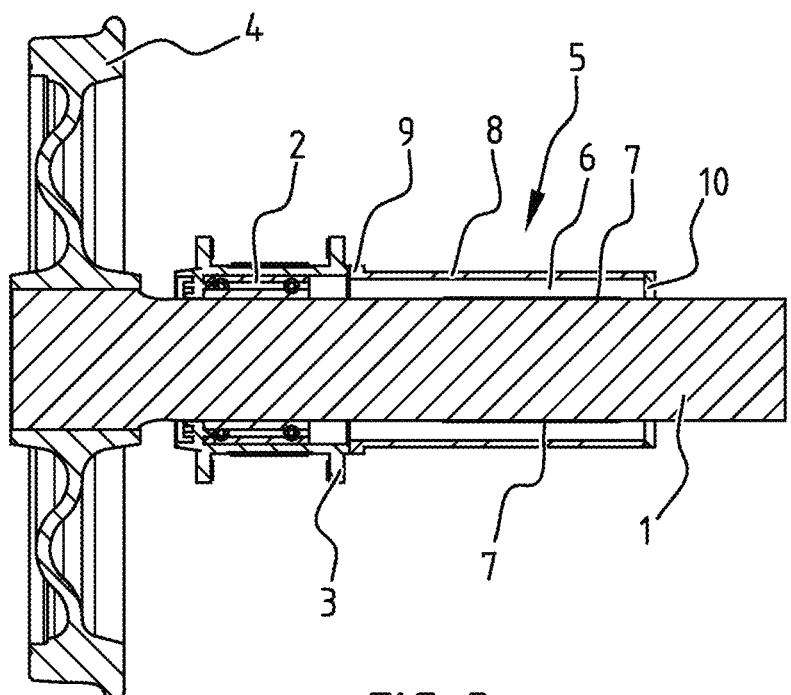
FIG. 3 is a sectional view according to the arrows III in FIG. 2.

According to the figures, the end of an axle 1 of the railway car is journaled in a bearing 2, which bearing is connected to the chassis of the railway car by means of beams 3. Mounted on the end of the axle 1, on the outer side of the bearing 2, is a train wheel 4. An induction generator 5 is mounted to the inner side of the bearing 2 around and on the axle 1. The generator 5 comprises a stator 6 and a rotor consisting of a number of permanent magnets 7 mounted in the circumference of the axle 1.

The magnets 7, which are elongate or bar-shaped, are mounted in mutually parallel slots milled in axial direction in the circumferential wall of the axle 1.

The stator 6 is mounted to the inner wall of a cylindrical housing 8, which extends co-axially around and spaced from the rotor. The stator 6 comprises one or more electrical conductors, which form the coils of the generator. The conductor(s) is/are connected to an inverter for controlling the current, the frequency and/or the voltage of the electricity being generated. The inverter is connected to a battery and/or, for example, directly to a refrigerating unit for refrigerating the load compartment of the railway car.

One end of the cylindrical housing 8 is provided with an outwardly extending flange 9, which forms a means of attachment for attaching the stator to the inner side of the bearing 2 by means of screws. The other end of the housing 8 is provided with an inwardly extending flange 10, which extends to quite near the surface of the axle 1, so that the interior of the housing 8 is sealed against the ingress of dirt.

The invention has thus been described by means of a preferred embodiment. It should be understood, however, that the present description is mainly illustrative. Various details of the structure and function have been presented, but modifications which are made thereto and which are fully extended by the general sense of the terminology used in the appended claims are to be understood to fall within the principle of the present invention. The description and the drawings are to be used for interpreting the claims. The claims must not be interpreted such that the scope of the protection sought is to be understood as being defined by the strict, literal meaning of the words used in the claims, in which case the description and the drawings would be used only to eliminate any ambiguity found in the claims. To determine the scope of the protection sought by means of the claims, any element equivalent to an element specified therein is to be taken into suitable consideration.

The invention claimed is:

1. A railway car fitted with an induction generator comprising magnets and electrical conductors for generating electricity, comprising a chassis comprising at least one axle with two wheels, wherein the axle is mounted in two bearings located near the two sides of the railway car, wherein the wheels are located on outer sides of the bearings, and wherein the generator comprises a rotor and a substantially cylindrical stator, which stator extends concentrically around the rotor, wherein the rotor is fixedly mounted around and on the axle, wherein the stator is mounted to an inner side of one of the bearings, in axial abutment therewith,
wherein the stator is mounted to inner wall of a substantially cylindrical housing, which housing is mounted to the inner side of one of the bearings.

2. A railway car according to claim 1, wherein the housing has a radially outwardly extending circumferential flange at the outer end, which flange is mounted to the inner side of the bearing.

3. A railway car according to claim 1, wherein the housing has a radially inwardly, toward the axle, extending circumferential flange at an inner end, which flange seals an interior of the housing.

4. A railway car according to claim 1, wherein the generator is a synchronous generator, an asynchronous generator or a switched-reluctance generator.

5. A railway car according to claim 1, wherein the rotor comprises the magnets.

6. A railway car according to claim 1, wherein the magnets are permanent magnets.

7. A railway car according to claim 1, wherein the magnets are mounted in recesses in the circumference of the axle.

8. A railway car according to claim 7, wherein the recesses have been milled in the circumference of the axle.

9. A railway car according to claim 1, wherein the stator comprises the electrical conductors.

10. A railway car according to claim 1, wherein the conductors are connected to an inverter that is configured to control current, frequency and/or voltage of the electricity being generated.

11. A railway car according to claim 1, wherein the conductors are connected to a battery in which the generated electricity is stored.

12. A railway car according to claim 1, wherein the car is a refrigerator car wherein the electricity is used for refrigerating a load compartment of the car.

13. A railway car fitted with an induction generator comprising magnets and electrical conductors for generating electricity, comprising a chassis comprising at least one axle with two wheels, wherein the axle is mounted in two bearings located near the two sides of the railway car, wherein the wheels are located on outer sides of the bearings, and wherein the generator comprises a rotor and a substantially cylindrical stator, which stator extends concentrically around the rotor, wherein the rotor is fixedly mounted around and on the axle, wherein the stator is mounted to an inner side of one of the bearings, in axial abutment therewith;
a cylindrical housing surrounding the axle, wherein the stator is mounted to an inner wall of the cylindrical housing, which housing is mounted to the inner side of one of the bearings;
wherein the magnets are mounted in recesses in the circumference of the axle positioned inside the cylindrical housing.

* * * * *